United States Patent
Chiba et al.

(10) Patent No.: US 7,611,567 B2
(45) Date of Patent: Nov. 3, 2009

(54) EXHAUST GAS PURIFYING APPARATUS FOR INTERNAL COMBUSTION ENGINE

(75) Inventors: Isao Chiba, Wako (JP); Ryuji Matsukado, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 575 days.

(21) Appl. No.: 11/432,505

(22) Filed: May 12, 2006

(65) Prior Publication Data

US 2006/0254262 A1 Nov. 16, 2006

(30) Foreign Application Priority Data

May 13, 2005 (JP) .............................. 2005-140568

(51) Int. Cl.
*B01D 46/00* (2006.01)
*F01N 3/023* (2006.01)

(52) U.S. Cl. ...................... 95/278; 55/282.3; 55/385.3; 55/523; 55/524; 55/DIG. 5; 55/DIG. 10; 55/DIG. 30; 95/1; 95/26; 95/273; 96/417; 96/418; 96/421; 96/424; 60/274; 60/297; 60/299; 60/303; 60/311; 701/102; 701/114

(58) Field of Classification Search ................ 55/282.2, 55/282.3, 385.3, 523, 524, DIG. 5, DIG. 10, 55/DIG. 30; 96/417, 418, 421, 424; 95/1, 95/26, 273, 278; 60/274, 295, 297, 299, 60/300, 303, 311; 701/101, 102, 114

See application file for complete search history.

(56) References Cited

U.S. PATENT DOCUMENTS

| | | | | |
|---|---|---|---|---|
| 5,319,930 A | * | 6/1994 | Shinzawa et al. | 60/286 |
| 6,497,095 B2 | * | 12/2002 | Carberry et al. | 60/311 |
| 6,708,487 B2 | * | 3/2004 | Morimoto et al. | 60/311 |
| 6,952,919 B2 | * | 10/2005 | Otake et al. | 60/274 |
| 6,983,591 B2 | * | 1/2006 | Kondo et al. | 60/311 |
| 7,040,086 B2 | * | 5/2006 | Kitahara et al. | 60/311 |
| 7,146,804 B2 | * | 12/2006 | Yahata et al. | 60/311 |

FOREIGN PATENT DOCUMENTS

| | | | |
|---|---|---|---|
| EP | 1 431 531 A1 | | 6/2004 |
| EP | 1 524 425 A1 | | 4/2005 |
| EP | 1 568 872 A1 | | 8/2005 |
| EP | 1 760 283 A1 | | 3/2007 |
| JP | 2003-322044 A | | 11/2003 |
| JP | 2005-155574 | * | 6/2005 |
| JP | 2005-155574 A | | 6/2005 |
| JP | 2005-220882 | * | 8/2005 |

* cited by examiner

*Primary Examiner*—Jason M Greene
(74) *Attorney, Agent, or Firm*—Arent Fox LLP

(57) ABSTRACT

An exhaust gas purifying apparatus for an internal combustion engine includes a particulate filter for trapping particulates found in the exhaust gases of the engine. The regeneration process for burning the particulates trapped in the particulate filter is executed by performing post injection of fuel. The regeneration process is suppressed according to an amount of fuel injected during post injection.

18 Claims, 6 Drawing Sheets

EXHAUST GAS PURIFYING APPARATUS FOR INTERNAL COMBUSTION ENGINE

BACKGROUND OF THE INVENTION

1. Field of the Invention

The present invention relates to an exhaust gas purifying apparatus for an internal combustion engine, and particularly, to the apparatus having a particulate filter, such as a diesel particulate filter, hereinafter referred to as DPF, which traps particulates, also referred to as particulate matter, in exhaust gases of the internal combustion engine.

2. Description of the Related Art

A technique wherein a DPF is provided, which traps particulates in exhaust gases in the exhaust system of a diesel internal combustion engine and reduces an emission amount of the particulates, is widely used. Since there is a limit in the amount of particulates that can be trapped in the DPF, a regeneration process is timely performed wherein the particulates accumulated in the DPF are burned. The regeneration process is performed, for example, by executing a fuel injection during the exhaust stroke (hereinafter referred to as "post injection") wherein unburnt fuel is supplied to the catalytic converter disposed upstream of the DPF and the fuel in the catalytic converter is burned, thereby raising the exhaust gas temperature.

It has been confirmed that execution of the post injection process gradually dilutes the lubricating oil in the cylinder. If dilution of the lubricating oil is allowed to continue unchecked, the engine cannot operate normally. Accordingly, it is necessary to avoid, or at least suppress, excessive dilution of the lubricating oil.

Japanese Patent Laid-open No. 2003-322044 (JP '044) discloses a technique for suppressing dilution of the lubricating oil in a gasoline internal combustion engine in which fuel is directly injected into the cylinders.

According to the method taught in JP '044, a dilution counter begins counting during the cold start of the engine in which the lubricating oil dilution is likely to occur. If the dilution counter reaches a value equal to or greater than a predetermined value, a fuel injection timing of the engine is changed in the advancing direction.

However, in the regeneration process of the DPF mounted in a diesel internal combustion engine, if the execution timing of the post injection process is greatly advanced or advanced too much, the fuel injected during the post injection process burns within the cylinder which results in unintended increase in the output torque. Further, if the advanced amount of the post injection timing is too small or otherwise insufficient, advancing the post injection timing is not an effective manner for suppressing dilution of the lubricating oil.

SUMMARY OF THE INVENTION

The present invention is made contemplating the above, and an aspect of the present invention provides an exhaust gas purifying apparatus for an internal combustion engine that can suppress dilution of the lubricating oil by appropriately performing the post injection during the regeneration process of the DPF.

In order to attain the above aspect, the invention provides an exhaust gas purifying apparatus for an internal combustion engine, having a particulate filter that traps the particulates found in the exhaust gases produced by the internal combustion engine. The exhaust gas purifying apparatus further includes regeneration means and control means. The regeneration means performs a regeneration process which involves burning the particulates trapped in the particulate filter by performing post injection of fuel. The control means suppresses the regeneration process performed by the regeneration means according to an amount of fuel (QPOST) injected during post injection.

With the above-described structural configuration, the regeneration process is suppressed according to the amount of fuel injected during post injection. Therefore, when the amount of fuel injected by the post injection becomes extensive or too high, dilution of the lubricating oil by the post-injected fuel is suppressed by suppressing execution of the regeneration process, i.e., the post injection.

Preferably, the exhaust gas purifying apparatus further includes travel distance calculating means for calculating a travel distance (DIST) of a vehicle driven by the engine. The control means determines a restart timing of the regeneration process according to the travel distance from the time suppression of the regeneration process begins, and restarts the regeneration process at the determined restart timing.

With the above-described structural configuration, the restart timing of the regeneration process is determined according to the travel distance from the time suppression of the regeneration process begins, and the regeneration process is restarted at the determined restart timing. The amount of fuel which causes dilution of the oil decreases as the vehicle runs. Accordingly, the regeneration process is restarted at an appropriate timing by determining the restart timing of the regeneration process according to the travel distance, thereby suppressing any increase in the amount of accumulated particulates.

Preferably, the control means calculates an integrated value (IQPOST) of the amount of fuel injected by post injection and suppresses the regeneration process when the integrated value (IQPOST) reaches a value equal to or greater than an upper limit threshold value (IQPLH).

With the above-described structural configuration, the integrated value of the amount of post-injected fuel is calculated, and the regeneration process is suppressed when the integrated value equals or is greater than the upper limit threshold value. The degree of diluted lubricating oil is detected using the integrated value of the amount of post-injected fuel. Therefore, it is possible to prevent excessive dilution of the lubricating oil by suppressing the regeneration process when the integrated value equals or is greater than the upper limit threshold value.

Preferably, the control means sets the upper limit threshold value according to the travel distance from the time the regeneration process has been completed.

With the above-described structural configuration, the upper limit threshold value is set according to the travel distance from the time the regeneration process has been completed. The amount of fuel which is injected during post injection and subsequently remains in the cylinder decreases as the travel distance becomes longer. Consequently, suppression of dilution of the lubricating oil and the combustion of particulates is appropriately performed by setting the upper limit threshold value according to the travel distance.

Preferably, the control means suppresses the regeneration process by the regeneration means from the time the regeneration process has been completed, and permits the regeneration process when the upper limit threshold value (IQPLH) equals or is greater than a first restart determination threshold value (IQRST1).

With the above-described structural configuration, the regeneration process is suppressed from the time the regeneration process has been completed, and the regeneration process is permitted when the upper limit threshold value equals or is greater than the first restart determination threshold value. When the regeneration process is completed, the rate at which the lubricating oil is diluted becomes high due to the fuel injected by post injection. Therefore, excessive dilution of the lubricating oil is prevented by permitting the next regeneration process to occur after a predetermined amount of fuel evaporates and is discharged while the vehicle is running.

Preferably, the control means resets the integrated value (IQPOST) and the upper limit threshold value (IQPLH) when the regeneration process has been completed.

With the above-described structural configuration, the integrated value of the amount of post-injected fuel and the upper limit threshold value are reset when the regeneration process has been completed. It is considered that the particulate accumulation amount of the particulate filter becomes "0" and the particulate filter substantially returns to the initial state when the regeneration process has been completed. Accordingly, resetting the integrated value of the amount of post-injected fuel and the upper limit threshold value does not result in the erroneous determination of the timing for suppressing the regeneration process. Therefore, the integrated value of the amount of post-injected fuel and the upper limit threshold value are reset. As such, the values of the parameters are prevented from becoming excessive, thereby reducing the load on the computing device.

Preferably, the control means sets an upper limit threshold value (IQPLH) according to the travel distance (DIST) from the time the regeneration process has been completed, suppresses the regeneration process by the regeneration means from the time the regeneration process has been completed, permits the regeneration process when the upper limit threshold value (IQPLH) equals or is greater than the first restart determination threshold value (IQRST1), suppresses the regeneration process when an integrated value (IQPOST) of the fuel injected by the post injection reaches the upper limit threshold value (IQPLH) during the regeneration process, and restarts the regeneration process when a difference between the integrated value (IQPOST) and the upper limit threshold value (IQPLH) reaches a second restart determination threshold value (IQRST2), and the second restart determination threshold value (IQRST2) is set to a value less than the first restart determination threshold value (IQRST2).

With the above-described structural configuration, the upper limit threshold value is set according to the travel distance from the time the regeneration process has been completed, the regeneration process is suppressed from the time the regeneration process has been completed, and the regeneration process is permitted when the upper limit threshold value equals or is greater than the first restart determination threshold value. When the regeneration process has been completed, the dilution rate of the lubricating oil becomes high due to the fuel injected by the post injection. Therefore, excessive dilution of the lubricating oil is prevented by permitting the next regeneration process to occur after a predetermined amount of fuel evaporates and is discharged while the vehicle is running.

Further, the regeneration process is suppressed when the integrated value of the post-injected fuel amount reaches the upper limit threshold value, and the regeneration process is restarted when the difference between the integrated value of the post-injected fuel amount and the upper limit threshold value reaches the second restart determination threshold value. When the difference between the integrated value of the post-injected fuel amount and the upper limit threshold value, calculated according to the travel distance, reaches the second restart determination threshold value, the post-injected fuel is discharged while the vehicle is running. Accordingly, the determination can be made that the engine condition has reached a state wherein the post injection can be performed without the excessive dilution of the lubricating oil.

Consequently, by restarting the regeneration process at the time the difference reaches the second restart determination threshold value, an excessive amount of particulates can be prevented from accumulating in the particulate filter. Further, by setting the second restart determination threshold value to a value less than the first restart determination threshold value, the restart timing of the regeneration process can be advanced and the amount of accumulated particulates appropriately reduced.

Preferably, the exhaust gas purifying apparatus further includes particulate amount calculating means for calculating an amount (GPM) of particulates trapped in the particulate filter and warning lamp blinking means for making a warning lamp blink when the particulate amount (GPM) is equal to or greater than a predetermined amount (GPML2). The warning lamp blinking means does not make the warning lamp blink when the regeneration process is suppressed by the control means even if the particulate amount (GPM) is equal to or greater than the predetermined amount (GPML2).

With the above-described structural configuration, the amount of particulates trapped in the particulate filter is calculated, and the warning lamp is made to blink if the amount of particulates is equal to or greater than a predetermined amount. Although blinking of the warning lamp suggests to the driver that the engine should be operated to promote regeneration of the DPF, the regeneration process is not performed in any engine operating condition when the regeneration process is suppressed. Consequently, blinking of the warning lamp is stopped when the regeneration process is suppressed, thereby preventing the driver from taking a futile action for promoting the DPF regeneration.

DETAILED DESCRIPTION OF THE PREFERRED EMBODIMENTS

Preferred embodiments of the present invention will now be described with reference to the drawings.

Figure 1:
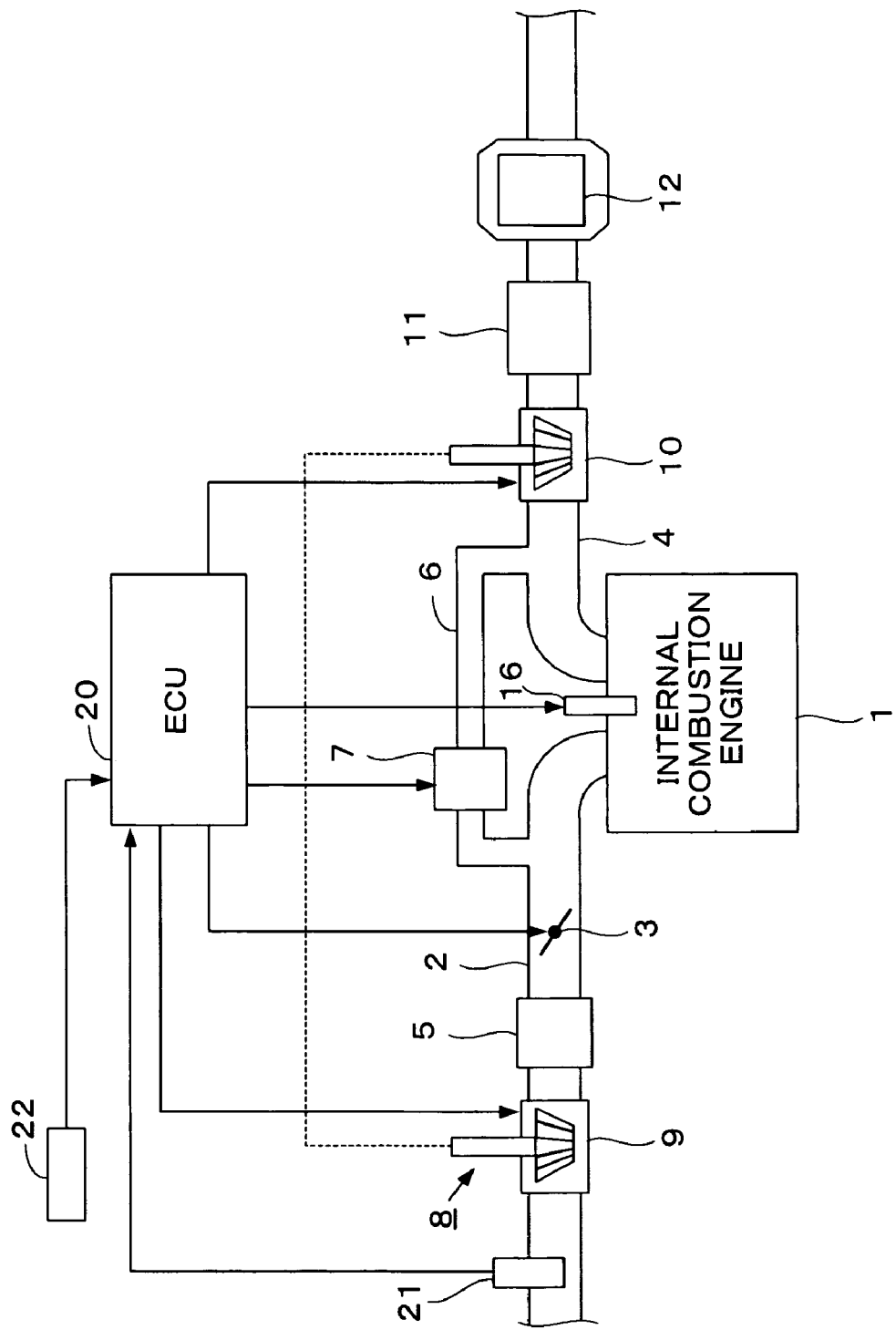
FIG. 1 is a schematic diagram illustrating a configuration of an internal combustion engine and a control system therefor according to an embodiment of the present invention.

FIG. 1 is a schematic diagram illustrating the structural configuration of an internal combustion engine provided with an exhaust gas purifying apparatus and a control device according to an embodiment of the present invention. An internal combustion engine 1 (hereinafter referred to merely as "engine") is a diesel engine in which fuel is injected directly into cylinders, wherein each cylinder is provided with a fuel injection valve 16. The fuel injection valve 16 is electrically connected to the electronic control unit 20 (hereinafter referred to as "ECU"). A valve opening period and a valve opening timing of the fuel injection valve 16 are both controlled by the ECU 20.

The engine 1 is provided with an intake pipe 2, an exhaust pipe 4, and a turbocharger 8. The turbocharger 8 has a turbine 10 driven by the kinetic energy of exhaust gases and a compressor 9 for compressing the intake air. The compressor 9 is rotationally driven by the turbine 10.

The turbine 10 has a plurality of movable vanes (not shown), and is configured to have a rotational speed that is varied by changing an opening of the movable vanes. Opening of the vanes of the turbine 10 is electro-magnetically controlled by the ECU 20.

An intercooler 5 for cooling the pressurized air and an intake shutter 3 (throttle valve) for controlling an intake air amount are disposed downstream of the compressor 9 and within the intake pipe 2. Opening and closing of the intake shutter 3 is controlled by the ECU 20 through an actuator (not shown).

An exhaust gas recirculation passage 6 is provided between the upstream side of the turbine 10, which is disposed in the exhaust pipe 4, and the downstream side of the intake shutter 5, which is disposed in the intake pipe 2. The exhaust gas recirculation passage 6 recirculates exhaust gases to the intake pipe 2. The exhaust gas recirculation passage 6 is provided with an exhaust gas recirculation control valve 7 (hereinafter referred to as "EGR valve") for controlling an exhaust gas recirculation amount. The EGR valve 7 is an electromagnetic valve having a solenoid. Opening of the EGR valve 7 is controlled by the ECU 20.

When viewed from the upstream side, the exhaust pipe 4 is provided with a catalytic converter 11 for purifying the exhaust gases and then a DPF 12. The catalytic converter 11 and the DPF 12 are disposed downstream of the turbine 10.

The catalytic converter 11 includes an oxidation catalyst for accelerating oxidation of any hydrocarbons and carbon monoxide in the exhaust gases. Further, the catalytic converter 11 may include a NOx adsorbent and a catalyst for reducing NOx.

The DPF 12 traps soot, which includes particulates whose main component is carbon (C) in the exhaust gases, when the exhaust gases pass through small holes in the filter wall. Specifically, the inflowing soot is accumulated on the surface of the filter wall and in the small holes in the filter wall. For example, ceramics, such as silicon carbide (SiC) or porous metal, are used to form the filter wall.

If the DPF 12 traps enough soot to reach the upper limit of the soot trapping capacity, i.e., to the accumulation limit, the exhaust pressure rises excessively. Therefore, it is necessary to timely perform the regeneration process of burning the trapped soot. During the regeneration process, post injection is performed to raise the temperature of the exhaust gases to the burning temperature of soot. Post injection is performed during the exhaust stroke through the fuel injection valve 16. The fuel injected during post injection burns in the catalytic converter 11 which raises the temperature of the exhaust gases flowing into the DPF 12.

Further, a crank angle position sensor 22, an intake air flow rate sensor 21, a coolant temperature sensor (not shown), an accelerator sensor, and the like, are provided. The crank angle position sensor detects a rotational angle of the crankshaft of the engine 1. The intake air flow rate sensor 21 detects an intake air flow rate GA of the engine 1. The coolant temperature sensor detects a coolant temperature of the engine 1. The accelerator sensor detects an operation amount (AP) of the accelerator of the vehicle driven by the engine 1. The detection signals from these sensors are supplied to the ECU 20. The rotational speed (NE) of the engine 1 is calculated from the output of the crank angle position sensor 22.

The ECU 20 includes an input circuit, a central processing unit (hereinafter referred to as "CPU"), a memory circuit, and an output circuit. The input circuit performs numerous functions, including shaping the waveforms of the input signals from the various sensors, correcting the voltage levels of the input signals to a predetermined level, and converting analog signal values into digital signal values. The memory circuit preliminarily stores various operating programs to be executed by the CPU and stores the computation results, and the like, performed by the CPU. The output circuit supplies control signals to the fuel injection valve 16, the EGR valve 7, and the like.

Figure 2:
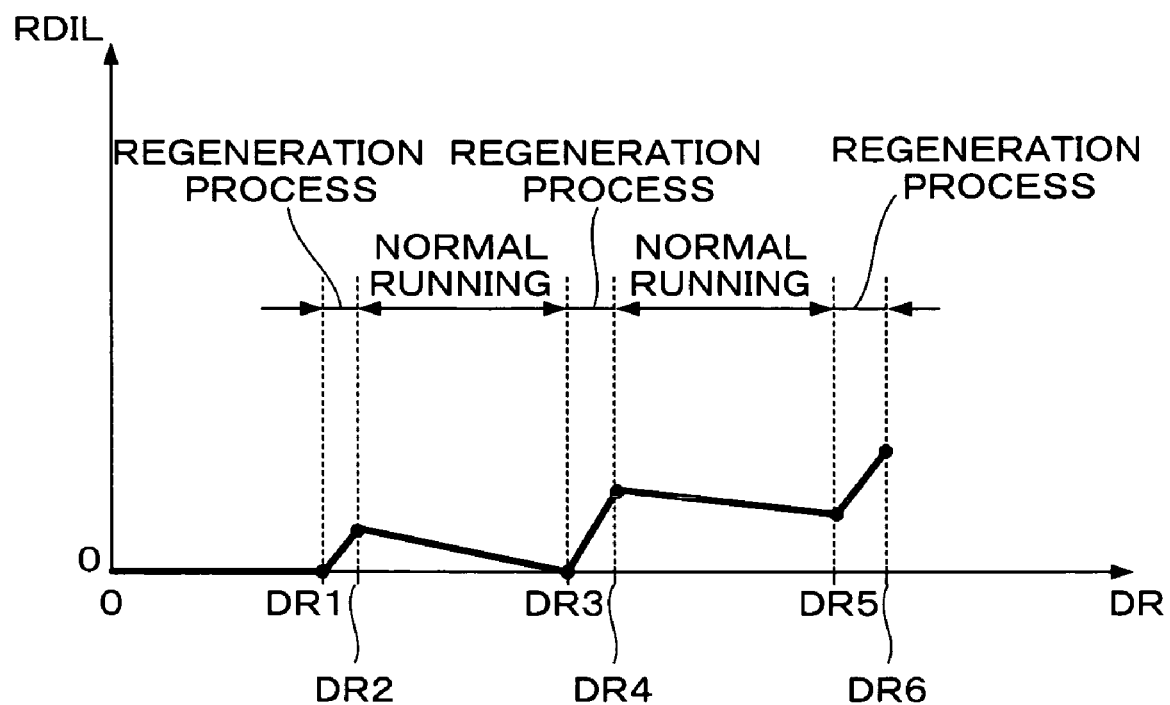
FIG. 2 is a time chart which explains dilution of the lubricating oil caused by post injection of fuel.

FIG. 2 is a time chart illustrating the dilution rate of the lubricating oil of the engine 1 caused by performing post injection during the DPF regeneration process. The horizontal axis of FIG. 2 represents a travel distance DR and the vertical axis represents a dilution rate RDIL of the lubricating oil. In the example shown in FIG. 2, normal running is performed until the travel distance DR reaches the distance DR1. When the travel distance DR reaches the distance DR1, the DPF regeneration process is performed for a comparatively short time period (e.g., up to the distance DR2). In this time period, post injection is performed and the dilution rate RDIL increases.

When the travel distance DR reaches the distance DR2, the DPF regeneration process ends and the running condition of the vehicle shifts to normal running. During normal running, fuel mixed with the lubricating oil gradually evaporates, burns, and is then discharged (or discharged without burning). Therefore, the dilution rate RDIL gradually decreases.

When the travel distance DR reaches the distance DR3, the dilution rate RDIL becomes almost zero and the DPF regeneration process is started. The DPF regeneration process is performed until the travel distance DR reaches the distance DR4 during which the dilution rate RDIL gradually increases.

After the travel distance DR exceeds the distance DR4, normal running is performed. When the travel distance DR reaches the distance DR5, the dilution rate RDIL does not yet become zero, but the accumulation amount of particulates in the DPF 12 becomes extensive. Accordingly, the DPF regeneration process is started. Therefore, the dilution rate RDIL gradually increases, again. As described above, if the post injection is performed according to the accumulation amount of particulates without any restriction, the dilution rate RDIL gradually becomes higher over a long time period which results in undesirable effects on the engine 1.

Therefore, in the instantly-described embodiment, execution of post injection is restricted as described below so as to appropriately suppress dilution of the lubricating oil and burn the particulates accumulated in the DPF 12.

Figure 3:
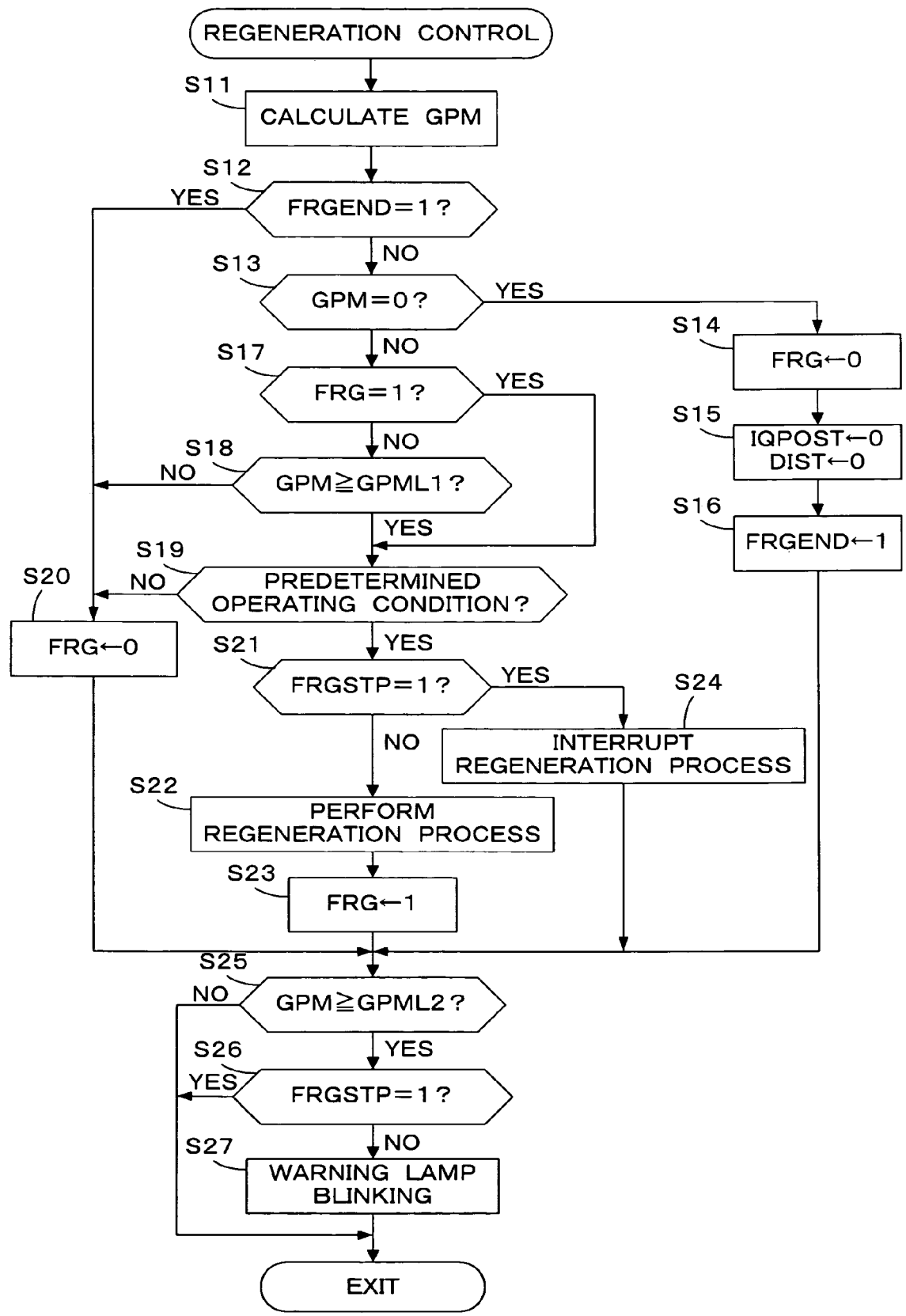
FIG. 3 is a flowchart of a process for controlling an execution of the regeneration process of the DPF.

FIG. 3 is a flowchart of the regeneration control process, which controls execution of the DPF regeneration process. The regeneration control process is executed by the CPU in the ECU 20 at predetermined time intervals of T1.

In step S11, an accumulation amount GPMUT of particulates per predetermined time period T1 (hereinafter referred to as "particulate change amount") is calculated according to the engine rotational speed NE and a fuel injection amount QINJ. Further, an accumulation amount GPM of particulates in the DPF 12 is calculated by integrating the particulate change amount GPMUT. When the DPF regeneration process is performed, the particulate change amount GPMUT is set to a negative predetermined value so that the particulate accumulation amount GPM decreases with time elapsing. The minimum value of the particulate accumulation amount GPM is limited to "0", i.e., a limit process is performed so that the particulate accumulation amount GPM may not take a negative value. The fuel injection amount QINJ is calculated according to the engine rotational speed NE and the operation amount AP of the accelerator pedal, which indicates an amount of torque being demanded of the engine 1.

In step S12, it is determined whether a regeneration completion flag FRGEND is "1". The regeneration completion flag FRGEND is set to "1" in step S16 when the regeneration process has been completed. Since the answer to step S12 is initially negative (NO), the process proceeds to step S13, in which it is determined whether the particulate accumulation amount GPM is "0". The answer to step S13 is negative (NO) unless the DPF regeneration process has been completed, and the process proceeds to step S17, in which it is determined whether a regeneration execution flag FRG is "1". Since the answer to step S17 is initially negative (NO), it is determined whether the particulate accumulation amount GPM is equal to or greater than a first threshold value GPML1 (step S18).

Since the answer to step S18 is initially negative (NO), the process proceeds to step S20, in which the regeneration execution flag FRG is set to "0". Subsequently, it is determined whether the particulate accumulation amount GPM is equal to or greater than second threshold value GPML2, which is greater than the first threshold value GPML1 (step S25). If the answer to step S18 is negative (NO), the answer to step S25 is also negative (NO), and the process immediately ends.

Figure 5:
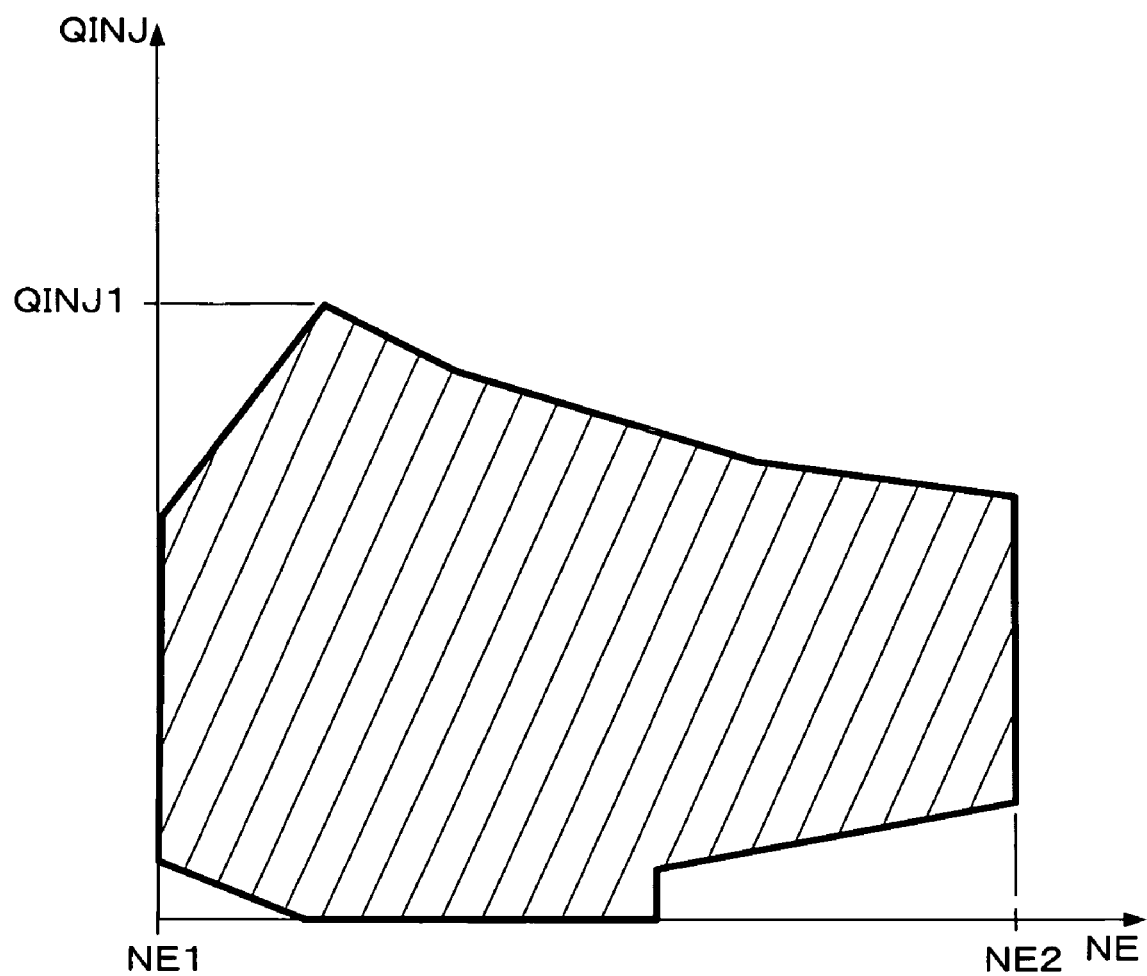
FIG. 5 is a diagram for explaining a predetermined operating condition where an execution of the regeneration process is permitted.

If the particulate accumulation amount GPM gradually increases to become equal to or greater than the first threshold PML1 in step S18, the process proceeds to step S19, in which it is determined whether the operating condition of the engine 1 is a predetermined operating condition in which the regeneration process can be performed. The predetermined operating condition is, for example, set to a condition where the engine rotational speed NE and the fuel injection amount QINJ are in a predetermined low load operating area identified by the hatching shown in FIG. 5. The predetermined rotational speeds NE1 and NE2 shown in FIG. 5 are, for example, 1000 rpm(s) and 4000 rpm(s), respectively, and QINJ1 shown in FIG. 5 is, for example, set to a value of about 70% of the fuel injection amount corresponding to the full load operation.

If the engine operating condition is not the predetermined operating condition, the process proceeds to step S20. In this case, the answer to step S25 may sometimes be affirmative (YES). If the answer to step S25 is affirmative (YES), it is determined whether a regeneration interruption flag FRGSTP is "1" (step S26). The regeneration interruption flag FRGSTP is set to "1" when it is determined in the process of FIG. 4, which will be described below, that the regeneration process should be interrupted.

If the answer to step S26 is negative (NO), i.e., the regeneration interruption flag FRGSTP is "0", a warning lamp (not shown) blinks. The blinking warning lamp is intended to give the driver a warning that the particulate accumulation amount of the DPF 12 has become too large, and to recommend, for example, the vehicle be run in the suburbs, which makes it possible to perform the regeneration process of the particulates.

If the regeneration interruption flag FRGSTP is equal to "1" in step S26, which indicates that the regeneration process is being interrupted, the process immediately ends. This is because the regeneration process is not performed, even if the driver runs the vehicle in the suburbs, and the blinking warning lamp is rendered meaningless. Accordingly, the driver can be prevented from taking a futile action in response to the blinking warning lamp.

If the answer to step S19 is affirmative (YES), the process proceeds to step S21, in which it is determined whether the regeneration interruption flag FRGSTP is "1". While the answer to step S21 is negative (NO), the regeneration process (post injection) is performed (step S22) and the regeneration execution flag FRG is set to "1" (step S23). After executing step S23, the process proceeds to step S25.

After execution of step S23, the answer to step S17 becomes affirmative (YES). Accordingly, the process proceeds to step S21 via step S19 as long as the engine operating condition is the predetermined operating condition. If the regeneration interruption flag FRGSTP is "0", the regeneration process is continued (step S22). If the particulate accumulation amount GPM becomes "0", the process proceeds from step S13 to step S14, in which the regeneration execution flag FRG is returned to "0". Subsequently, an integrated post injection fuel amount IQPOST, calculated in the process of FIG. 4 described below, and a travel distance parameter DIST are both reset to "0" (step S15). Further, the regeneration completion flag FRGEND is set to "1" (step S16) and the process proceeds to step S25.

On the other hand, if the regeneration interruption flag FRGSTP is set to "1", the process proceeds from step S21 to step S24, in which the regeneration process is interrupted. Thereafter, if the regeneration interruption flag FRGSTP is returned to "0", the process proceeds from step S21 to step S22, in which the regeneration process is performed.

Figure 4:
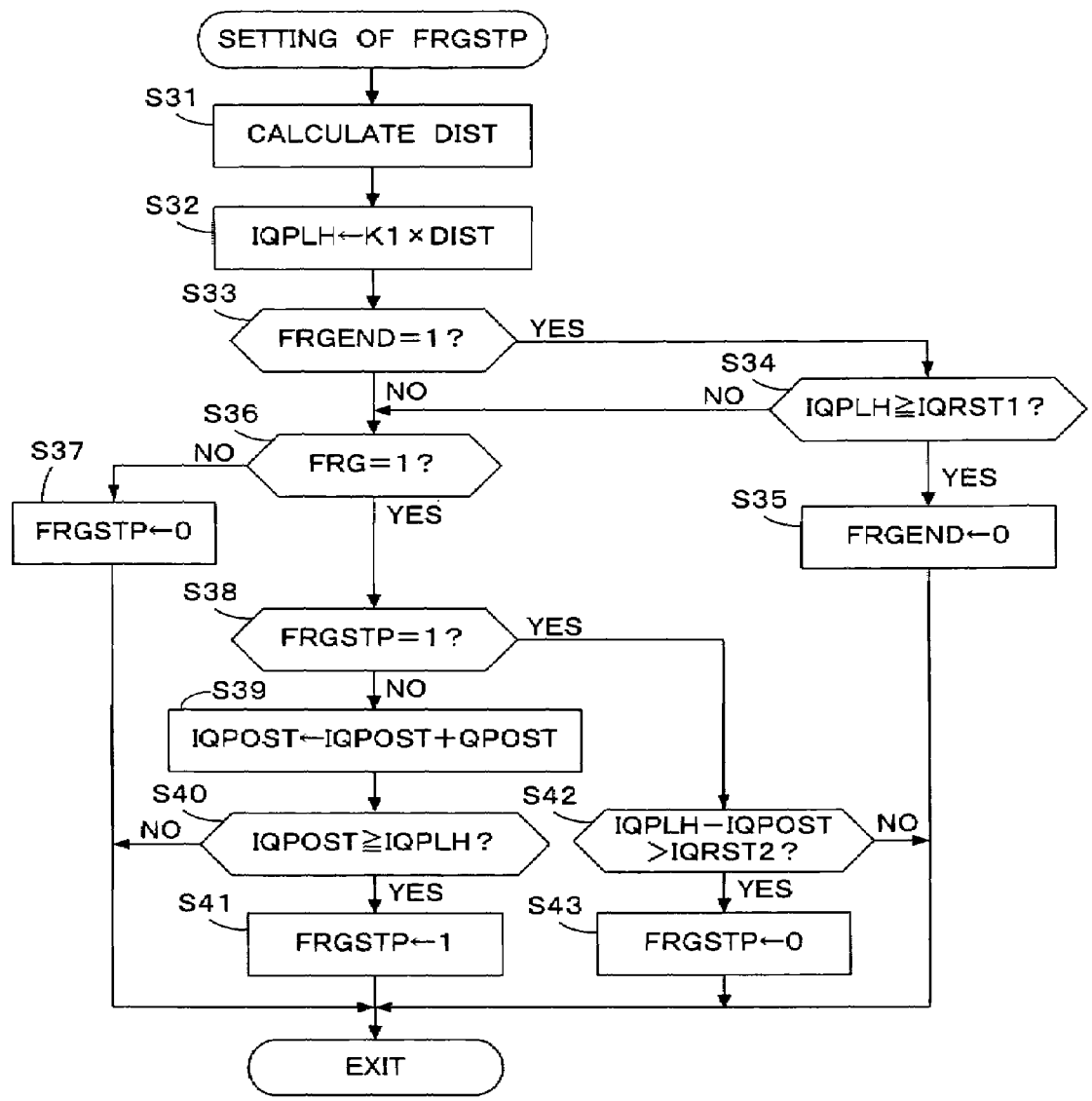
FIG. 4 is a flowchart of a process for setting a flag referred to in the process of FIG. 3.

FIG. 4 is a flowchart showing a process for setting the regeneration interruption flag FRGSTP that is referred to in the process of FIG. 3. The process of setting the regeneration interruption flag FRGSTP is executed, similarly to the process of FIG. 3, by the CPU in the ECU 20 at the predetermined time intervals of T1.

In step S31, the travel distance parameter DIST is calculated. The travel distance parameter DIST is a parameter indicating a travel distance of the vehicle after completion of the DPF regeneration process, and is calculated based on the travel distance DR measured by the travel distance meter (odometer). In step S32, an upper limit threshold value IQPLH is calculated by applying the travel distance parameter DIST to the equation (1). The upper limit threshold value IQPLH is referred to in steps S34, S40, and S42.

$$IQPLH = K1 \times DIST \tag{1}$$

where K1 is a predetermined coefficient.

In step S33, it is determined whether the regeneration completion flag FRGEND is "1". Since FRGEND is equal to "1" immediately after the regeneration process has been completed, the process proceeds to step S34, in which it is determined whether the upper limit threshold value IQPLH calculated in step S32 is equal to or greater than a first restart determination threshold value IQRST1. Immediately after completion of the regeneration process, since the answer to step S34 is negative (NO), the process proceeds to step S36. The travel distance parameter DIST increases as the vehicle runs, so that the upper limit threshold value IQPLH also increases. If the upper limit threshold value IQPLH reaches a value equal to or greater than the first restart determination threshold value IQRST1, the process proceeds from step S34 to step S35, in which the regeneration completion flag FRGEND is returned to "0". Then, the answer to step S12 of FIG. 3 becomes negative (NO), and execution of the next regeneration process is permitted. Further, since the answer to step S33 becomes negative (NO), the process immediately proceeds to step S36.

In step S36, it is determined whether the regeneration execution flag FRG is "1". If the answer to step S36 is negative (NO), the regeneration interruption flag FRGSTP is set to "0" (step S37) and the process ends.

If the regeneration execution flag FRG is set to "1" in the process of FIG. 3, the process proceeds from step S36 to step S38, in which it is determined whether the regeneration interruption flag FRGSTP is "1". Since the answer to step S38 is initially negative (NO), the post injection fuel amount QPOST is integrated by the equation (2) to calculate the integrated post injection fuel amount IQPOST (step S39).

$$IQPOST = IQPOST + QPOST \quad (2)$$

In step S40, it is determined whether the integrated post injection fuel amount IQPOST is equal to or greater than the upper limit threshold value IQPLH calculated in step S32. If the answer to step S40 is negative (NO), the process immediately ends.

If the integrated post injection fuel amount IQPOST is equal to or greater than the upper limit threshold value IQPLH in step S40, the regeneration interruption flag FRGSTP is set to "1" (step S41) and the process ends.

After the regeneration interruption flag FRGSTP is set to "1", the answer to step S38 becomes affirmative (YES) and the process proceeds to step S42 in which it is determined whether a difference (IQPLH-IQPOST) between the upper limit threshold value IQPLH calculated in step S32 and the integrated post injection fuel amount IQPOST is greater than the second restart determination threshold value IQRST2 (step S42). If the answer to step S42 is negative (NO), the process immediately ends and the interruption of the regeneration process is continued. If the answer to step S42 becomes affirmative (YES), the dilution rate of the lubricating oil decreases due to the interruption of the regeneration process (the normal running). Accordingly, it is determined that the regeneration process can be performed without too much dilution of the lubricating oil and the regeneration interruption flag FRGSTP is returned to "0" (step S43). When the regeneration interruption flag FRGSTP is returned to "0", the regeneration process is restarted.

The second restart determination threshold value IQRST2 is set to a value which is less than the first restart determination threshold value IQRST1. According to this setting, the restart of the regeneration process is permitted earlier after the interruption of the regeneration process, compared with after completion of the regeneration, i.e., the restart timing of the regeneration process after the interruption of the regeneration process is earlier than that after the completion of the regeneration. Therefore, the particulate accumulation amount can be appropriately reduced.

Figure 6A:
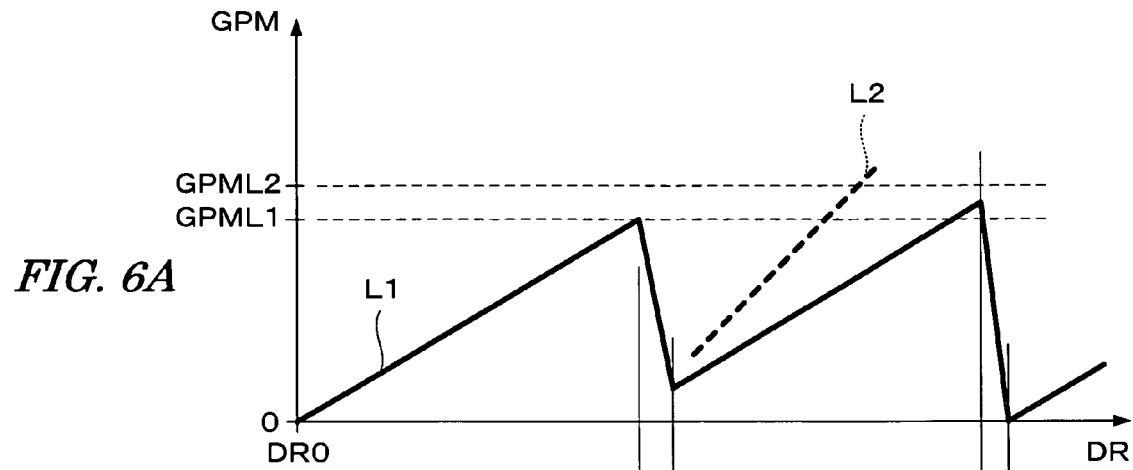
FIGS. 6A and 6B are diagrams used for explaining and further understanding the processes shown in the flowcharts of FIGS. 3 and 4.
Figure 6B:
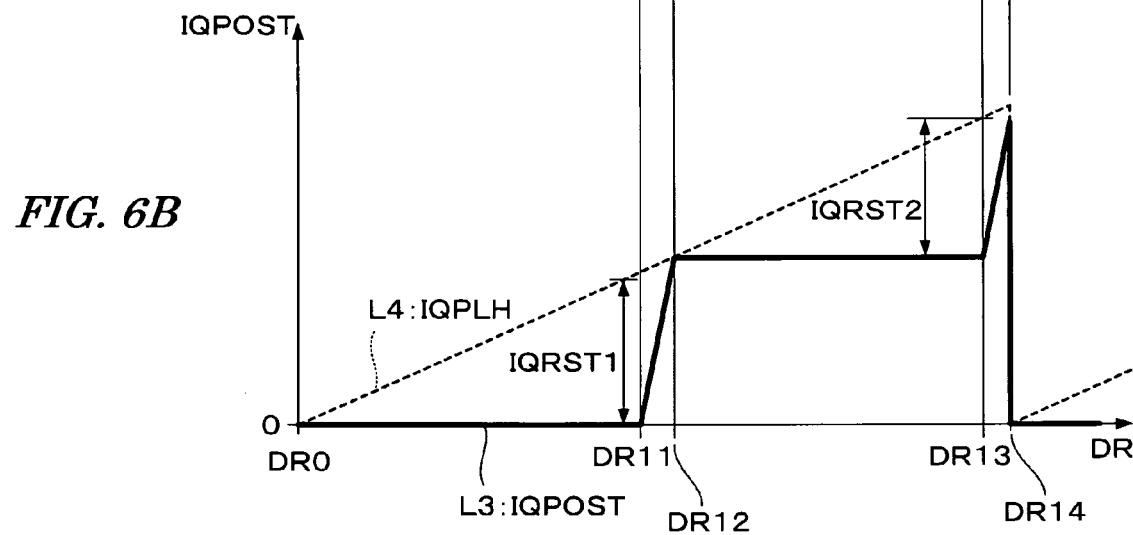

FIGS. 6A and 6B are diagrams used to further explain and understand the processes of FIGS. 3 and 4. FIG. 6A shows a change in the particulate accumulation amount GPM versus the travel distance DR, and FIG. 6B shows a change in the integrated post injection fuel amount IQPOST versus the travel distance DR.

When the travel distance DR is equal to an initial value DR0, the regeneration process of the DPF 12 is completed, and the particulate accumulation amount GPM and the integrated post injection fuel amount IQPOST are both set to "0". At first, normal running of the vehicle is performed, and the particulate accumulation amount GPM gradually increases as the travel distance DR increases, as shown by the solid line L1. However, the integrated post injection fuel amount IQPOST remains at "0" (solid line L3). The dashed line L4, shown in FIG. 6B, indicates a change in the upper limit threshold value IQPLH calculated by multiplying the travel distance parameter DIST with the predetermined coefficient K1. The regeneration process is inhibited until the upper limit threshold value IQPLH reaches the first restart determination threshold value IQRST1 (refer to FIG. 3, step S12, and FIG. 4, steps S33 to S35), thereby preventing the next regeneration process from being performed immediately after completion of the regeneration process. Consequently, the fuel remaining in the cylinders can evaporate to reduce the dilution rate of the lubricating oil.

When the travel distance DR reaches the distance DR11, the particulate accumulation amount GPM reaches the first threshold value GPML1 and the regeneration process is started. Accordingly, the integrated post injection fuel amount IQPOST increases and the particulate accumulation amount GPM decreases. When the travel distance DR reaches the distance DR12, the integrated post injection fuel amount IQPOST equals the upper limit threshold value IQPLH. Therefore, the regeneration process is interrupted.

When the regeneration process is interrupted, the particulate accumulation amount GPM gradually increases, while the integrated post injection fuel amount IQPOST maintains the value reached at the time of starting the interruption. When the travel distance DR reaches the distance DR13, (IQPLH-IQPOST) becomes equal to the second restart determination threshold value IQRST2 and the regeneration process is restarted. Consequently, the particulate accumulation amount GPM decreases. Thereafter, when the particulate accumulation amount GPM becomes equal to "0" (DR=DR14), the integrated post injection fuel amount IQPOST is reset to "0", and the travel distance parameter DIST is reset to "0" (FIG. 3, step S15). Accordingly, the upper limit threshold value IQPLH is also reset to "0".

The dashed line L2 shown in FIG. 6A illustrates an example where the amount of generated particulates is extensive and the particulate accumulation amount GPM exceeds the second threshold value GPML2 when the regeneration process is interrupted. In this example, step S24 is executed and step S27 is not executed in the process of FIG. 3. Consequently, the warning lamp does not blink.

As described above, in the present embodiment, when the integrated post injection fuel amount IQPOST, calculated by integrating the post injection fuel amount QPOST, becomes equal to or greater than the upper limit threshold value IQPLH, the regeneration process is interrupted (suppressed). Accordingly, dilution of the lubricating oil due to the post-injected fuel can be suppressed.

Further, when the difference between the upper limit threshold value IQPLH and the integrated post injection fuel amount IQPOST becomes equal to or greater than the second restart determination threshold value IQRST2, the regeneration process is restarted. Accordingly, the regeneration process can be restarted at an appropriate timing, thereby suppressing any increase in the particulate accumulation amount.

Further, when the regeneration process has been completed, the integrated post injection fuel amount IQPOST and the upper limit threshold value are reset. This can prevent the values of these parameters from becoming excessively extensive, thereby reducing the load on the CPU in the ECU 20.

In the present embodiment, the ECU 20 constitutes the regeneration means, the control means, the travel distance calculating means, the particulate amount calculating means, and the warning lamp blinking means. More specifically, the fuel injection control process (not shown) for performing the post fuel injection corresponds to the regeneration means.

Step S11 of FIG. 3 corresponds to the particulate amount calculating means. Steps S25 to S27 correspond to the warning lamp blinking means. Step S31 of FIG. 4 corresponds to the travel distance calculating means. Steps S12 to S24 of FIG. 3 and steps S32 to S43 of FIG. 4 correspond to the control means.

The present invention is not limited to the embodiment described above, and various modifications may be made. For example, in the embodiment described above, when the integrated post injection fuel amount IQPOST reaches the upper limit threshold value, the regeneration process is interrupted. Alternatively, the post injection fuel amount QPOST may be decreased to a value less than the usual amount in order to continue the regeneration process. That is, in such a case, the regeneration process is suppressed by decreasing the post injection fuel amount QPOST.

Further, a pressure difference ΔP between the upstream side pressure and the downstream side pressure of the DPF 12 may be detected, and the particulate accumulation amount GPM is calculated based on the detected pressure difference ΔP.

Further, the present invention can be applied also to an exhaust gas purifying apparatus for a watercraft propulsion engine, such as, for example, an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An exhaust gas purifying apparatus for an internal combustion engine, comprising:
    a particulate filter which traps particulates in exhaust gases of said engine;
    regeneration means for executing a regeneration process wherein the particulates trapped in said particulate filter are burned by performing a post injection of fuel;
    control means for suppressing the regeneration process by said regeneration means according to an amount of fuel injected during the post injection; and
    travel distance calculating means for calculating a travel distance of a vehicle driven by said engine, wherein said control means sets an upper limit threshold value according to the travel distance from the time the regeneration process has been completed; and
    wherein said control means calculates an integrated value of the amount of fuel injected during the post injection, and suppresses the regeneration process when the integrated value equals or is greater than an upper limit threshold value.

2. The exhaust gas purifying apparatus according to claim 1, wherein said control means further determines a restart timing of the regeneration process according to the travel distance from the time the suppression of the regeneration process is started and restarts the regeneration process at a determined restart timing.

3. The exhaust gas purifying apparatus according to claim 1, wherein said control means suppresses the regeneration process by said regeneration means from the time the regeneration process has been completed, and permits the regeneration process when the upper limit threshold value equals or is greater than a first restart determination threshold value.

4. The exhaust gas purifying apparatus according to claim 1, wherein said control means resets the integrated value and the upper limit threshold value when the regeneration process has been completed.

5. The exhaust gas purifying apparatus according to claim 1, wherein said control means, suppresses the regeneration process by the regeneration means from the time the regeneration process has been completed, permits the regeneration process when the upper limit threshold value equals or is greater than a first restart determination threshold value, and restarts the regeneration process when a difference between the integrated value and the upper limit threshold value reaches a second restart determination threshold value; and wherein the second restart determination threshold value is set to a value less than the first restart determination threshold value.

6. The exhaust gas purifying apparatus according to claim 1, further comprising particulate amount calculating means for calculating an amount of particulates trapped in said particulate filter; and
    warning lamp blinking means for making a warning lamp blink if the amount of particulates equals or is greater than a predetermined amount, wherein said warning lamp blinking means prevents the warning lamp from blinking when the regeneration process is suppressed by said control means, even if the amount of particulates equals or is greater than the predetermined amount.

7. An exhaust gas purifying method for an internal combustion engine having a particulate filter which traps particulates in exhaust gases of said engine, said method comprising the steps of:
    a) executing a regeneration process for burning the particulates trapped in said particulate filter by performing post injection of fuel;
    b) suppressing the regeneration process according to an amount of fuel injected during the post injection; and
    c) calculating a travel distance of a vehicle driven by said engine, wherein an upper limit threshold value is set according to the travel distance from the time the regeneration process has been completed; and
    wherein an integrated value of the amount of fuel injected during the post injection is calculated, and the regeneration process is suppressed when the integrated value equals or is greater than an upper limit threshold value.

8. The exhaust gas purifying method according to claim 7, further comprising the following steps:
    determining a restart timing of the regeneration process according to the travel distance from a time the suppression of the regeneration process is started; and
    restarting the regeneration process at the determined restart timing.

9. The exhaust gas purifying method according to claim 7, wherein the regeneration process is suppressed from the time the regeneration process has been completed and the regeneration process is permitted when the upper limit threshold value becomes equal to or greater than a first restart determination threshold value.

10. The exhaust gas purifying method according to claim 7, wherein the integrated value and the upper limit threshold value are reset when the regeneration process has been completed.

11. The exhaust gas purifying method according to claim 7, further comprising the following steps:
    suppressing the regeneration process from the time the regeneration process has been completed, permitting the regeneration process to continue when the upper limit threshold value becomes equal to or greater than a first restart determination threshold value; and restarting the regeneration process when a difference between the integrated value and the upper limit threshold value reaches a second restart determination threshold value, wherein the second restart determination threshold value is set to a value less than the first restart determination threshold value.

12. The exhaust gas purifying method according to claim 7, further comprising the following steps:

calculating an amount of particulates trapped in said particulate filter; and instructing a warning lamp to blink if the amount of particulates is equal to or greater than a predetermined amount, wherein the warning lamp is not made to blink when the regeneration process is suppressed even if the amount of particulates is equal to or greater than the predetermined amount.

13. A computer program embodied on a computer-readable medium, for causing a computer to implement an exhaust gas purifying method for an internal combustion engine having a particulate filter which traps particulates in exhaust gases of said engine, said method comprising the steps of:

a) executing a regeneration process for burning the particulates trapped in said particulate filter by performing post injection of fuel;

b) suppressing the regeneration process according to an amount of fuel injected during the post injection; and c) calculating a travel distance of a vehicle driven by said engine, wherein an upper limit threshold value is set according to the travel distance from the time the regeneration process has been completed;

wherein an integrated value of the amount of fuel injected during the post injection is calculated, and the regeneration process is suppressed when the integrated value equals or is greater than an upper limit threshold value.

14. The computer program according to claim 13, wherein said method further comprises the following steps:

determining a restart timing of the regeneration process according to the travel distance from a time the suppression of the regeneration process is started; and restarting the regeneration process at the determined restart timing.

15. The computer program according to claim 13, wherein the regeneration process is suppressed from the time the regeneration process has been completed and the regeneration process is permitted when the upper limit threshold value becomes equal to or greater than a first restart determination threshold value.

16. The computer program according to claim 13, wherein the integrated value and the upper limit threshold value are reset when the regeneration process has been completed.

17. The computer program according to claim 13, wherein said method further comprises the following steps:

suppressing the regeneration process from the time the regeneration process has been completed, permitting the regeneration process to continue when the upper limit threshold value becomes equal to or greater than a first restart determination threshold value; and restarting the regeneration process when a difference between the integrated value and the upper limit threshold value reaches a second restart determination threshold value, wherein the second restart determination threshold value is set to a value less than the first restart determination threshold value.

18. The computer program according to claim 13, wherein said method further comprises the following steps:

calculating an amount of particulates trapped in said particulate filter; and instructing a warning lamp to blink if the amount of particulates is equal to or greater than a predetermined amount, wherein the warning lamp is not made to blink when the regeneration process is suppressed even if the amount of particulates is equal to or greater than the predetermined amount.

* * * * *

UNITED STATES PATENT AND TRADEMARK OFFICE
CERTIFICATE OF CORRECTION

PATENT NO.       : 7,611,567 B2  Page 1 of 1
APPLICATION NO. : 11/432505
DATED            : November 3, 2009
INVENTOR(S)      : Chiba et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 750 days.

Signed and Sealed this

Twelfth Day of October, 2010

David J. Kappos
*Director of the United States Patent and Trademark Office*